United States Patent
Bellino et al.

(10) Patent No.: US 11,390,136 B2
(45) Date of Patent: Jul. 19, 2022

(54) CABIN AIR CONDITIONING SYSTEM FOR A VEHICLE AND METHOD OF CONTROLLING THE VEHICLE AND SYSTEM

(71) Applicant: Ford Global Technologies, LLC, Dearborn, MI (US)

(72) Inventors: Mary Bellino, Dearborn, MI (US); Nicholas David Moore, Dearborn, MI (US); Joseph George, Canton, MI (US); Rohan Shrivastava, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 16/519,528

(22) Filed: Jul. 23, 2019

(65) Prior Publication Data

US 2021/0023908 A1   Jan. 28, 2021

(51) Int. Cl.
| | |
|---|---|
| *B60H 1/00* | (2006.01) |
| *B60H 1/32* | (2006.01) |
| *B60L 1/00* | (2006.01) |
| *B60L 3/00* | (2019.01) |
| *B60L 58/10* | (2019.01) |
| *B60L 50/60* | (2019.01) |
| *B60L 50/51* | (2019.01) |

(Continued)

(52) U.S. Cl.
CPC ....... *B60H 1/00392* (2013.01); *B60H 1/3222* (2013.01); *B60L 1/003* (2013.01); *B60L 3/0069* (2013.01); *B60L 3/04* (2013.01); *B60L 50/51* (2019.02); *B60L 50/66* (2019.02); *B60L 53/14* (2019.02); *B60L 58/10* (2019.02); *B60L 2240/34* (2013.01); *B60L 2240/547* (2013.01); *B60L 2240/549* (2013.01)

(58) Field of Classification Search
CPC .... B60L 2240/545; B60L 1/003; B60L 50/66; B60L 58/10; B60L 3/04; B60L 53/14; B60L 2240/34; Y02T 10/7072; Y02T 90/14; B60H 1/3222; B60H 2001/00307; B60H 2001/3261
See application file for complete search history.

(56) References Cited

U.S. PATENT DOCUMENTS 10,556,484 B2 * 2/2020 Blatchley ........... G05D 23/1919
2012/0297809 A1 11/2012 Carpenter
(Continued)

*Primary Examiner* — Jared Fureman
*Assistant Examiner* — Duc M Pham
(74) *Attorney, Agent, or Firm* — Brooks Kushman P.C.; David B. Kelley

(57) ABSTRACT

An air conditioning system, a vehicle and a method of controlling the vehicle with a vehicle air conditioning system are provided. The vehicle air conditioning system has a refrigeration circuit having a compressor, a condenser, and an evaporator in sequential fluid communication, with a valve assembly and a battery chiller positioned for parallel flow with the evaporator. A cooling circuit in the vehicle has a chiller. A controller is configured to, in response to a temperature of the evaporator being less than a first predetermined value and the compressor operating at a predetermined speed, open the valve assembly to divert a portion of refrigerant through the chiller and away from the evaporator. The refrigerant may be diverted, for example, to raise the temperature of the evaporator and/or prevent cycling of the compressor.

20 Claims, 3 Drawing Sheets

(51) Int. Cl.
 *B60L 3/04* (2006.01)
 *B60L 53/14* (2019.01)

(56) References Cited

U.S. PATENT DOCUMENTS

2014/0338376 A1* 11/2014 Carpenter ............... B60L 50/51
                                                         62/115
2016/0339760 A1   11/2016 Dunn et al.
2017/0217279 A1*  8/2017 Jalilevand .......... B60H 1/00885
2017/0313158 A1   11/2017 Porras et al.

* cited by examiner

CABIN AIR CONDITIONING SYSTEM FOR A VEHICLE AND METHOD OF CONTROLLING THE VEHICLE AND SYSTEM

TECHNICAL FIELD

Various embodiments relate to a vehicle with a traction battery and a cabin air conditioning system, and a method for controlling the vehicle and system.

BACKGROUND

Vehicles conventionally have an air conditioning system for a vehicle cabin, e.g. a heating, ventilation, and air conditioning system, to provide climate control for the vehicle occupants. During operation of the air conditioning system, the evaporator may reach low operating temperatures, and if the temperatures are sufficiently low, the evaporator may experience icing and the performance of the air conditioning may be degraded. In order to de-ice an evaporator, the compressor for the air conditioning system is typically turned off such that the air conditioning system is disabled until the evaporator temperature rises and the evaporator de-ices.

SUMMARY

According to an embodiment, a vehicle is provided with a fluid circuit having a chiller and containing a coolant. A refrigeration circuit for a cabin air conditioning system is provided and contains a refrigerant. The refrigeration circuit has a compressor, a condenser, a first valve assembly and a cabin evaporator in sequential fluid communication. The refrigeration circuit has a second valve assembly and the chiller positioned for parallel flow of refrigerant with the first valve assembly and the cabin evaporator. A temperature sensor is positioned to measure a temperature of the evaporator. A controller is configured to, while the refrigeration circuit is operating and in response to the temperature of the evaporator being less than a first threshold value and the compressor operating at a predetermined speed, open the second valve assembly to divert a portion of refrigerant through the chiller while another portion of refrigerant flows in parallel through the evaporator.

According to another embodiment, a method of controlling a vehicle is provided. A refrigeration circuit is operated for a cabin air conditioning system containing a refrigerant, with the refrigeration circuit having a compressor, a condenser, a first valve assembly and a cabin evaporator in sequential fluid communication with refrigerant flowing therethrough. A signal is received that is indicative of a temperature of the evaporator. While the refrigeration circuit is operating and in response to the temperature of the evaporator being less than a first predetermined value and the compressor operating at a predetermined speed, a second valve assembly in the refrigeration circuit is opened to divert a portion of refrigerant through a chiller while another portion of refrigerant flows in parallel through the evaporator thereby increasing the temperature of the evaporator. The refrigeration circuit has the second valve assembly and the chiller positioned for parallel flow of refrigerant with the first valve assembly and the cabin evaporator.

According to yet another embodiment, a vehicle air conditioning system is provided with a refrigeration circuit having a compressor, a condenser, and an evaporator in sequential fluid communication, with a valve assembly and a battery chiller positioned for parallel flow with the evaporator. A controller is configured to, in response to a temperature of the evaporator being less than a first predetermined value and the compressor operating at a predetermined speed, open the valve assembly to divert a portion of refrigerant through the chiller and away from the evaporator.

DETAILED DESCRIPTION

As required, detailed embodiments of the present disclosure and provided herein;

however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
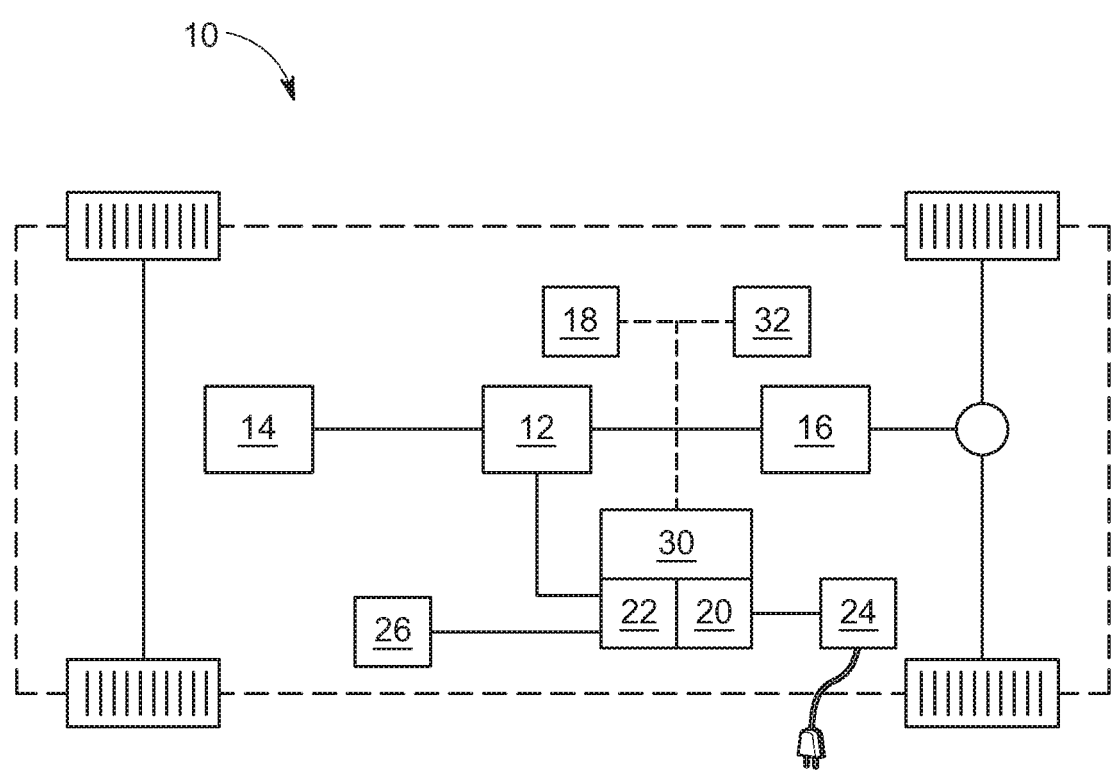
FIG. 1 illustrates a schematic of a vehicle according to an embodiment.

FIG. 1 illustrates a schematic of a vehicle 10 configured to implement the present disclosure. The vehicle 10 is an electrified vehicle, such that the vehicle may be propelled using electric power. In various examples, the vehicle 10 may be provided by a hybrid vehicle, such as a parallel, power split, or series hybrid electric vehicle, a battery electric vehicle, start-stop vehicle, a micro-hybrid vehicle, a plug-in hybrid electric vehicle, or other vehicle system architectures with electric propulsion.

The vehicle has one or more electric motors or electric machines 12 that are configured to propel the vehicle using electric power. In various examples, the vehicle may or may not have another prime mover, such as an internal combustion engine 14, or the like. The electric machine 12 outputs mechanical power when operating as a motor to propel the vehicle. The electric machine 12 may also operate as a generator to convert mechanical power into electrical power. The electric machine and any other prime movers are connected to the driveline and the vehicle wheels via a transmission 16.

The vehicle 10 has a control system 18 with one or more controllers or control modules for the various vehicle components and systems. The control system 18 for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The electric machine 12 is connected to an energy storage system 20 via an inverter 22. The energy storage system 20 may be provided by a high voltage battery or traction battery. A charger 24 may be provided to connect the vehicle to an outside electrical source, such as a charging station with 110 V or 220 V power. The traction battery 20 may be provided by a battery pack made up of one or more battery modules. Each battery module may contain one battery cell or a plurality of battery cells. The battery cells are heated and cooled using a coolant system 30 as described below with respect to FIG. 2. Additionally, electrical components for the vehicle, such as the inverter 22, the charger 24, a DC-DC converter 26 for a secondary battery or accessories, and the like, may be cooled using the coolant system. The coolant system 30 is in communication with the vehicle control system 18 and the on/off status or any requests for operation of the coolant system may be communicated via the vehicle controller 18, and can be based on, for example, an operating temperature of one or more of the electrical components, and the like.

The vehicle 10 includes a climate control system 32 as described below with respect to FIG. 2 for heating and cooling various vehicle components, including the vehicle cabin as a heating, ventilation, and air conditioning (HVAC) system. The climate control system 32 includes an electric compressor, according to one or more embodiments. The climate control system may additionally include one or more heaters. The climate control system 32 is in communication with the vehicle control system 18 and the on/off status may be communicated via the vehicle controller, and can be based on, for example, the status of an operator actuated switch, or the automatic control of the climate control system based on related functions, such as window defrost. The climate control system 32 may additionally be connected to a user interface to permit a user to set a temperature for the cabin.

Figure 2:
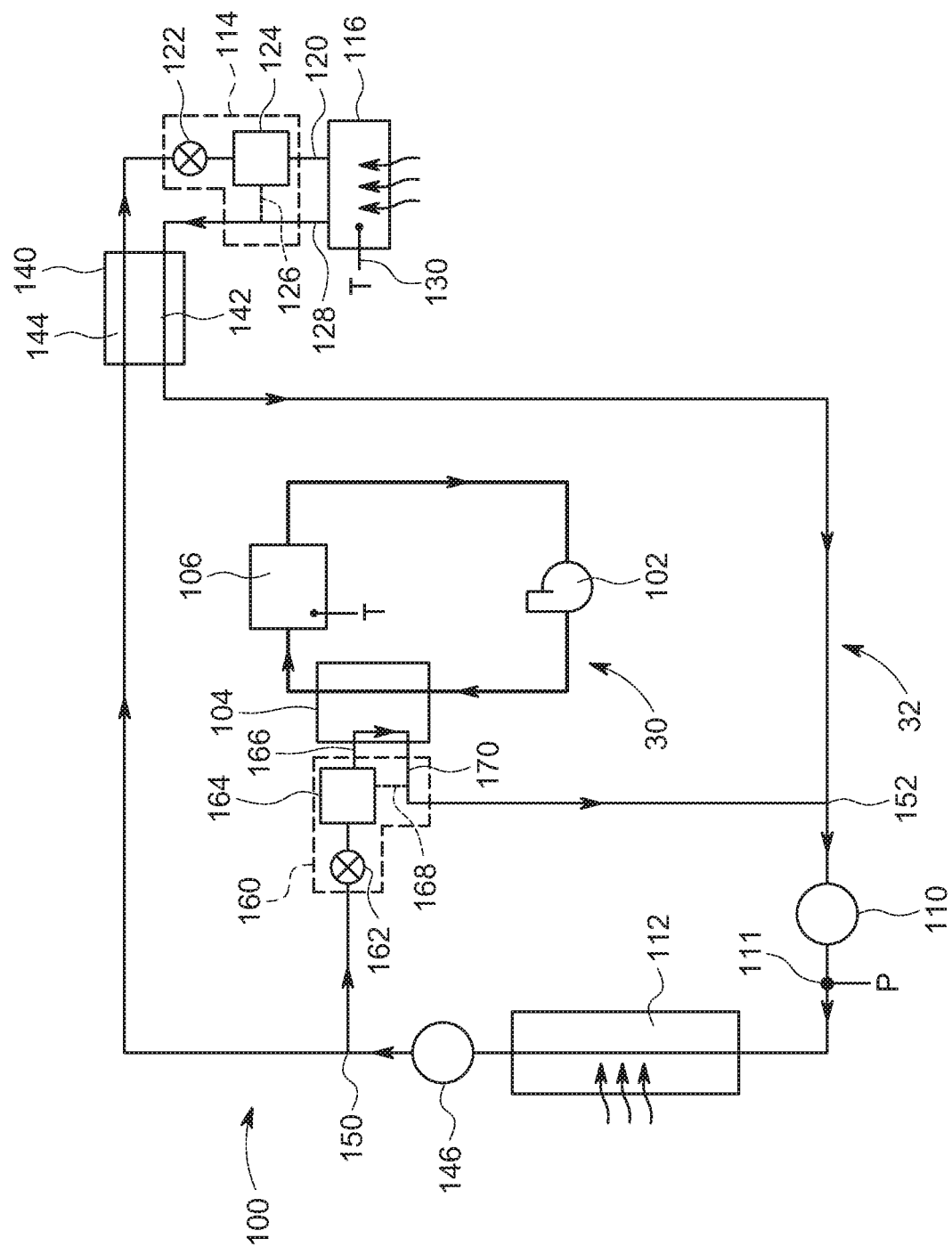
FIG. 2 illustrates a schematic of fluid systems for the vehicle according to an embodiment.

FIG. 2 illustrates a schematic of fluid systems 100 for use with the vehicle of FIG. 1 according to an embodiment. Components that are the same as or similar to those described above with respect to FIG. 1 are given the same reference number for simplicity.

The system 100 has a first fluid circuit or loop is provided, and may be used as a coolant system 30 for one or more vehicle electrical components such as a traction battery, inverter, charger, and the like. A second fluid circuit or loop is provided, and is provided as a cabin air conditioning system 32 with a refrigeration circuit or loop. The coolant circuit 30 and the refrigeration circuit 32 are provided as separate fluid loops such that the fluid in one circuit does not mix with the fluid in the other circuit. Additionally, the fluids in each circuit 30, 32 may be different from or the same as one another. As used herein, a fluid refers to a liquid-phase, a vapor-phase, or a mixed liquid-vapor phase for the fluid in the respective circuit. Additionally, the fluid may change phases within a respective circuit as it circulates. According to one example, the coolant in the fluid circuit 30 remains in liquid phase during operation of the circuit, while the refrigerant in the refrigeration circuit 32 may change phases within the circuit, for example, as in a vapor-compression refrigeration cycle.

The coolant circuit 30 is provided with a pump 102, a chiller 104, and a component 106 for thermal management. The cooling circuit 30 may be provided with a cooling jacket or other fluid passages within or adjacent to the component 106 for thermal management of the component. According to one example, the component 106 may be a traction battery 20, an inverter 22, a converter 26, a charger 24, or another component in the electric propulsion system for the vehicle 10. Although only one component 106 is shown, the cooling circuit 30 may be configured to cool multiple components, for example, with the coolant flowing to the components 106 arranged for parallel or series flow of coolant therethrough. Additionally, the cooling circuit 30 may have a single chiller 104 as shown, or more than one chiller 104 in various configurations.

Additionally, and in other examples, the coolant circuit 30 may be provided with a heater, such as a PTC heater, valves, a reservoir, and other fluid system components that are not shown for simplicity. The cooling circuit 30 may be provided with various sensors, for example, one or more temperature sensors on an associated component. The control system 18 operates the cooling circuit 30 to maintain operating temperatures of the component(s) 106 within a predetermined temperature range, for example, while the vehicle is operating. The controller 18 may receive a request or set a flag indicating that operation of the coolant circuit 30 and chiller 104 is required to cool the component 106, e.g. the chiller request is on.

The chiller 104 is provided as an internal heat exchanger with heat transferred between the coolant in the cooling circuit 30 and the refrigerant in the air conditioning circuit 32. When the cooling circuit 30 is used to cool a component, heat from the coolant may be transferred to the refrigerant via the chiller 104.

The refrigerant circuit 32 is provided with an electric compressor 110, a condenser 112, a first valve assembly 114, and an evaporator 116. The compressor 110, the condenser 112, the first valve assembly 114, and the evaporator 116 are arranged sequentially, or in series.

The compressor 110 is an electrically driven compressor, and may be rotated via an electric motor. As such, the speed of the compressor 110 is controllable and variable. The compressor 110 has an associated minimum operating speed, e.g. 800-1000, which may be defined as a predetermined speed of the compressor. Below the minimum operating speed, the compressor is shut off or turned off Alternatively, the predetermined speed may be set as a value that is higher than the minimum operating speed of the compressor 110. A pressure sensor 111 may be provided an outlet of the compressor 110 for use in controlling the compressor.

The condenser 112 is provided as a heat exchanger for the vehicle that condenses the vapor phase refrigerant into a liquid phase via heat exchange with another medium. In the example shown, the condenser 112 is provided as a radiator on the vehicle with heat exchange from the refrigerant to outside air. Although only one condenser 112 is shown, the circuit may have more than one condenser.

The first valve assembly 114 is positioned upstream of the evaporator 116. In the example shown, the first valve assembly 114 is located at an inlet 120 to the evaporator 116, e.g. directly upstream and adjacent to the evaporator inlet 120. The first valve assembly 114 acts as a throttle or an expansion valve for the evaporator 116 to cause an expansion of the refrigerant and resulting phase change.

In one example, the first valve assembly 114 may be provided as an electronic throttle valve that is controlled by the controller 18, and may be moved between a closed position with zero flow therethrough and an fully open position, and furthermore may be controlled to various partially open positions to meter flow therethrough. The electronic throttle valve provides for active control of the valve. The controller 18 may control the first valve assembly 114 as an electronic throttle valve to prevent refrigerant flow through the evaporator 116 (e.g. in a circuit with multiple evaporators) or to meter or otherwise permit refrigerant flow through the evaporator. In one example, the controller 18 may control the position of the electric throttle valve using a pressure from a pressure sensor at the outlet of the evaporator.

In another example, and as illustrated in the Figure, the first valve assembly 114 may be provided with a shutoff valve 122 that is immediately upstream of a throttle valve 124, such as a mechanical or passive throttle valve. The throttle valve 124 is immediately upstream of or at the inlet 120 to the evaporator. The shutoff valve 122 and the throttle valve 124 may be integrated into a single valve assembly housing or may be provided as separate sequentially arranged components. The shutoff valve 122 may be mechanically or electrically controlled as an on/off valve with two positions, e.g. between a shut off position with zero flow therethrough and a full flow position. The passive throttle valve 124 may be controlled by a system state, and in one example, a pilot line 126 is connected to the outlet 128 of the evaporator to control the position of the throttle valve via the pressure at the outlet of the evaporator. As the pressure of the refrigerant at the outlet 128 of the evaporator varies, the valve position for the throttle valve 124 likewise varies.

The evaporator 116 is provided as a heat exchanger for the vehicle that provides for heat transfer from air that is being directed to the cabin to the refrigerant to heat the refrigerant. The air may be outside air or may be recirculating air. The evaporator 116 may be provided with one or more temperature sensors 130 to measure the temperature of the evaporator 116 structure, e.g. a fin of the evaporator, or to measure a refrigerant temperature or air temperature flowing through the evaporator 116 or at an exit of the evaporator to infer the evaporator 116 temperature. The temperature sensor(s) 130 are in communication with the controller 18 and provide a signal indicative of the measured temperature to the controller 18.

In a further example, the refrigerant circuit 32 may have more than one evaporator 116, with the evaporators 116 arranged for parallel flow relative to one another. For a circuit 32 with multiple evaporators, one evaporator may be selected for use in controlling the circuit as described below. Alternatively, and for a circuit 32 with multiple evaporators, the control system may control the circuit based on any one of the evaporators reaching a predetermined condition.

In various examples, and as shown herein, the air conditioning system 32 may be provided with an integrated heat exchanger 140, for example a counterflow or coflow heat exchanger wherein heat is transferred from the outlet line 142 of the evaporator to the inlet line 144 of the evaporator. As shown in the Figure, the integrated heat exchanger 140 has a first passage 144 positioned upstream of the first valve assembly 114 and a second passage 142 positioned downstream of the outlet of evaporator 116. The first and second passages 144, 142 are arranged for heat transfer therebetween. In other examples according to the present disclosure, the air conditioning circuit may be provided without an integrated heat exchanger.

The air conditioning circuit may be provided with other system components, such as a dryer 146, and the like.

Under low environmental or outside air temperature conditions with the air conditioning system and circuit 32 operating to cool the cabin, the evaporator 116 temperature may approach zero degrees Celsius. Additionally, the evaporator may be operating at or below a dewpoint temperature of the air, and liquid condensation may occur on the evaporator, or within the evaporator if there is any moisture in the circuit 32. At these low temperatures, ice crystals or condensation may form or develop on the evaporator surfaces and reduce flow through the evaporator and reduce performance of the air conditioning system such that it does not operate as requested by the user or by the controller. This may be referred to as icing or freezing of the evaporator. Conventionally, and in order to prevent ice or condensate formation in the evaporator, the compressor 110 is cycled on and off to allow the evaporator 116 to warm up to temperatures where ice or condensate will not form. When the compressor 110 is cycled on and off, the cabin cooling is likewise interrupted and this results in temperature swings in the evaporator 116 and associated swings in cabin air discharge temperatures and breath-level temperatures. The system 100 according to the present disclosure provides an alternative control method to cycling the compressor on and off, and is described below with respect to FIGS. 2 and 3.

The refrigerant circuit 32 is also provided with the chiller 104 arranged for parallel flow with the evaporator 116. The input lines to the evaporator 116 and chiller 104 split at point 150 downstream of the condenser 112 outlet. The outlet lines from the evaporator 116 and the chiller 104 combine at point 152 upstream of the compressor 110 inlet.

The chiller has 104 an associated second valve assembly 160 that may be used to control and/or prevent flow of refrigerant to the chiller 104. The second valve assembly 160 may be used to control flow of refrigerant through the chiller 104, and may additionally be used to prevent refrigerant flow through the chiller 104, e.g. to isolate the chiller 104 and the coolant circuit 30 from the air conditioning system 32. The second valve assembly 160 and the chiller 104 are positioned for parallel flow of refrigerant with the first valve assembly 114 and the cabin evaporator 116.

The second valve assembly 160 may be provided as an electronic throttle valve as described above with respect to the first valve assembly 114, and the controller 18 may control the second valve assembly 160 to prevent refrigerant flow through the chiller 104 or to meter or otherwise permit refrigerant flow through the chiller 104. In one example, the controller 18 may control the position of the electric throttle valve using a pressure from a pressure sensor at the outlet of the chiller 104 on the refrigerant side.

Alternatively, the second valve assembly 160 may be provided as a shutoff valve 162 and passive throttle valve 164 as described above with respect to the first valve assembly 114, with the shutoff valve 162 immediately upstream of the passive throttle valve 164, and the passive throttle valve 164 immediately upstream of the inlet 166 to the chiller 104. The shutoff valve 162 may be mechanically controlled, or may be electrically controlled as an on/off valve with two positions. The passive throttle valve 164 may be controlled by a system state, and in one example, a pilot line 168 is connected to the outlet 170 of the evaporator to control the position of the throttle valve via the pressure at the outlet of the chiller.

In one example, the first and second valve assemblies 114, 160 are provided as the same valve assembly type. In another example, the first and second valve assemblies 114, 160 may be provided as different valve assembly types.

Figure 3:
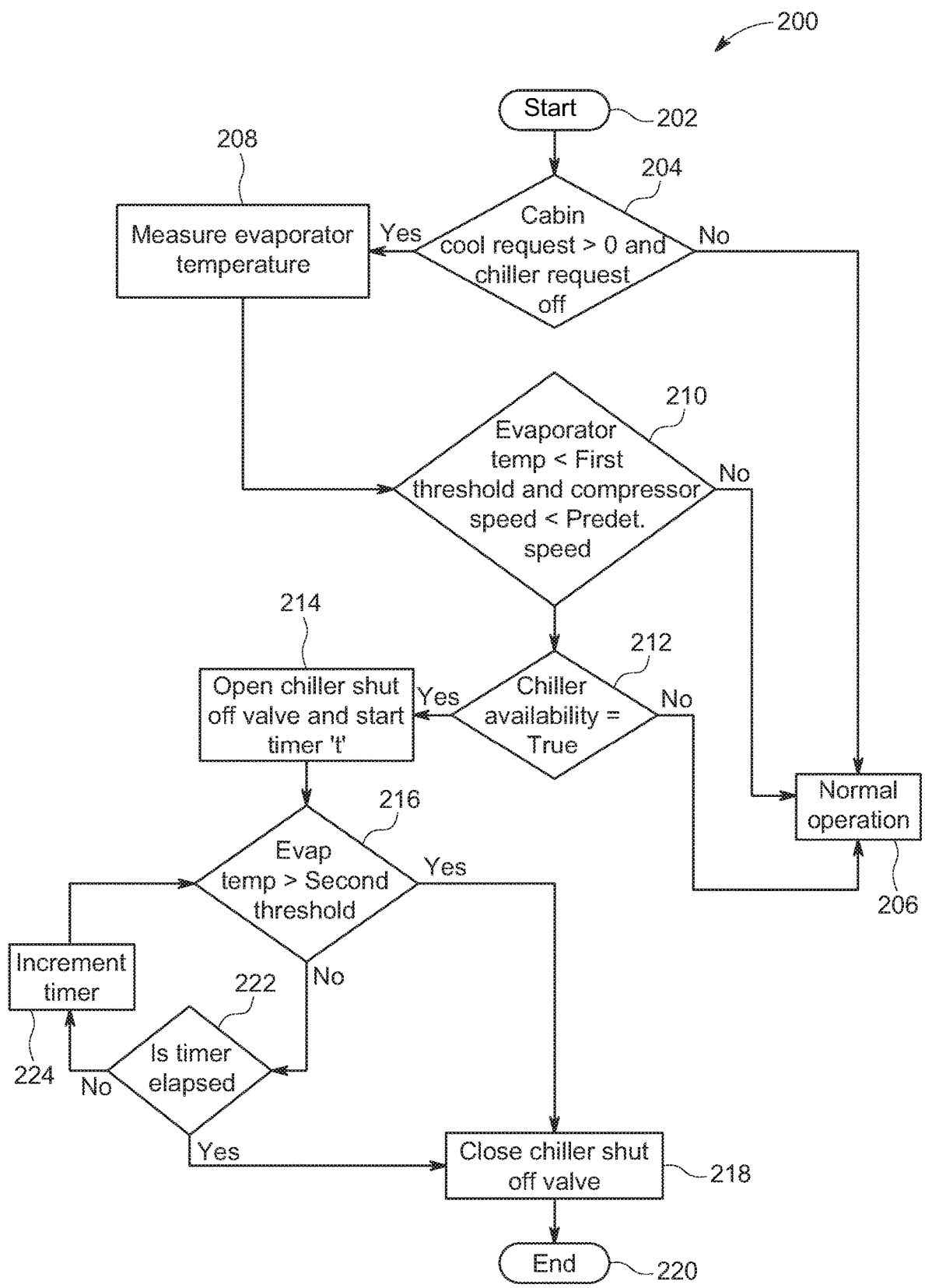
FIG. 3 illustrates a flow chart for a method of controlling the vehicle according to an embodiment.

When the evaporator 116 is at a low temperature such that there is a freezing risk, e.g. ice or condensate may form or there is a risk of ice or condensate forming, the air conditioning circuit 32 may be operated according to the method described with respect to FIG. 3 to open the second valve assembly 160 and allow a portion of the refrigerant to flow through the chiller 104 while another portion of the refrigerant or the remainder of the refrigerant flows through the evaporator 116 as controlled by valve 114. By opening the second valve assembly 160, the load on the refrigerant circuit 32 is increased, and a parallel flow path for refrigerant is opened for the refrigerant to flow through. The overall air conditioning circuit 32 capacity is therefore split between the evaporator 116 and the chiller 104. As the chiller 104 is a liquid-to-liquid heat exchanger, e.g. the coolant and the refrigerant are both in a liquid state as they flow through the chiller 104, the chiller 104 pulls more capacity from the air conditioning circuit 32 in comparison to the evaporator 116, which is an air-to-liquid heat exchanger, e.g. the cabin air is in a gas phase and the refrigerant is in a liquid or mixed vapor phase, thus reducing the evaporator's effectiveness. As a result of the parallel flow and reduced evaporator effectiveness, the evaporator 116 temperature increases, resulting in a lower risk of ice or condensate formation and avoiding the need to cycle the compressor 110 on and off.

A controller 18 is provided and is in communication with the sensors and component states of the air conditioning circuit 32 and in the coolant circuit 30. The controller 18 may control the speed of the compressor 110, may control the first and second valve assemblies 114, 160 for electronic throttle valves or for electronic shutoff valves, and may additionally receive data indicative of temperatures and pressures at various points in the air conditioning circuit 32. The controller 18 may additionally receive a signal indicative of a system state or request for the coolant circuit 30, or be integrated with the controller for the coolant circuit 30 or the components thereof.

FIG. 3 illustrates a flow chart for a method 200 according to the present disclosure. The method may be used to control the systems 100 of FIG. 2 and control the vehicle 10 of FIG. 1 according to various embodiments. The method may be implemented by a controller such as the controller and control system 18 in FIGS. 1-2. In other examples, various steps may be omitted, added, rearranged into another order, or performed sequentially or simultaneously. Although the method 200 is described with respect to use with a vehicle system 100 as shown in FIG. 2, the method may likewise be applied for use with a vehicle system having another vehicle component and fluid system as described above, and in a vehicle with another architecture as described above with respect to FIG. 1. At step 202, the method 200 starts.

At step 204, the controller 18 determines if there is a request for air conditioning in the cabin, e.g. from a user request to the HVAC control interface, or from another vehicle system or controller. The refrigeration circuit 32 for a cabin air conditioning system is therefore operating. The controller 18 also determines if there is a request for operation of the chiller 104 and the coolant cycle, e.g. if the coolant cycle 30 is required to cool a component 106 such as a traction battery, or is otherwise needed to perform functions related to thermal management of the components in the circuit.

If there is no request for operation of the cabin air conditioning system 32 and there is a request for operation of the chiller 104 and coolant circuit 30, then the method 200 proceeds to block 206 and operates under conventional control methods. If there is a request for operation of the cabin air conditioning system 32 and there is no request for operation of the chiller 104 and coolant circuit 30, then the method 200 proceeds to step 208.

At step 208, the controller 18 is configured to receive a signal indicative of the evaporator temperature from sensor 130. The controller 18 may additionally receive other data such as ambient temperature, requested cabin temperature, current cabin temperature, and the like.

At step 210, the controller 18 determines if the evaporator 116 temperature is below a first threshold value. The first threshold value may be set at a specified temperature, for example, five degrees Celsius, two degrees Celsius, zero degrees Celsius, or the like. The first threshold value may be stored in a lookup table that is accessible in memory by the controller 18. In one example, the first threshold value is a set value. In a further example, the first threshold value may vary, for example as a function of ambient temperature, and/or other factors.

At step 210, the controller 18 also determines if the compressor 110 is operating at or below a predetermined speed. For example, the controller 18 may determine if the compressor 110 is operating at a minimum operating speed for the compressor, below an offset value above the minimum operating speed for the compressor 110, within a specified speed range of the minimum speed for the compressor, or the like.

If the evaporator 116 temperature is not less than the first threshold value and/or the compressor 110 is not operating at or below a predetermined speed, the method 200 proceeds to block 206. Note that if the evaporator 116 temperature is less than the first threshold value and the compressor 110 is not operating at or below a predetermined speed, the controller 18 will control the speed of the compressor 110, e.g. by reducing the speed of the compressor 110, to reduce the load on the evaporator 116 and allow the temperature of the evaporator 116 to increase to reduce the risk of freezing.

If the evaporator 116 temperature is less than the first threshold value and the compressor 110 is operating at or below a predetermined speed, the method 200 proceeds to block 212.

At step 212, the controller 18 determines if the chiller 104 is available for use with the air conditioning system 32. The chiller 104 may be unavailable based on an error or flag set in another component in the coolant circuit 30, or in the chiller 104 itself. If the chiller 104 is unavailable, the method 200 proceed to block 206. If the chiller is available, the method 200 proceeds to block 214.

At step 214, the second valve assembly 160 is opened, e.g. by opening a shutoff valve 162 or controlling an electronic throttle valve to an open or partially open position to divert a portion of refrigerant through a chiller 104 while another portion of refrigerant flows in parallel through the evaporator 116 thereby increasing the temperature of the evaporator. The valve assembly 160 is opened while the refrigeration circuit 32 is operating and in response to the temperature of the evaporator 116 being less than a first predetermined value and the compressor 110 operating at a predetermined speed. While the second valve assembly 160 is open, heat is transferred from the portion of refrigerant in the chiller 104 to coolant in the chiller 104, and heat is also transferred from the another portion of refrigerant in the evaporator 116 to air such as cabin air. Based on the use of the chiller 104 in parallel flow with the evaporator 116, the load on the evaporator is reduced such that the temperature of the evaporator increases.

At step 214, the controller 18 also starts a timer. The controller 18 also maintains the first valve assembly 114 in an open or partially open state while the second valve assembly 160 is opened. In one example, the controller 18 may generally maintain a speed of the compressor 110 at or near the predetermined speed while the valve assembly 160 is open and unless the controller 18 receives an input or reaches a state where an increased compressor speed would be required.

The method then proceeds to block 216 where the controller 18 determines if the evaporator 116 temperature is greater than a second threshold value. The second threshold value is greater than the first threshold value, and may be on the order of 2-5 degrees Celsius higher than the first threshold value.

If the evaporator 116 temperature is greater than the second threshold value, the method 200 proceeds to step 218. At step 218, the controller 18 closes the second valve assembly 160, e.g. by closing the shutoff valve 162 or by commanding an electronic throttle valve to a fully closed position, thereby isolating the chiller 104 from the refrigerant circuit 32. At step 218, the controller 18 also resets the timer.

From step 218, the method 200 proceeds to step 220 and ends, or returns to step 202 to continue to monitor the evaporator 116.

If the evaporator 116 temperature is not greater than the second threshold value, the method 200 proceeds to step 222 to determine if the timer has elapsed. The timer may have a set time or predetermined time value such as two minutes, five minutes, or another suitable time that allows for the evaporator to warm and decrease the risk of freezing.

If the timer has elapsed, the method proceeds to step 218 and closes the second valve assembly 160. The method 200 therefore provides for closing the second valve assembly 160 in response to at least one of (i) the temperature of the evaporator 116 being above the second predetermined value, and (ii) the timer reaching the predetermined time value.

If the timer has not elapsed, the method proceeds to step 224 and increments the timer. From step 224, the method 200 returns to block 216.

The method 200 therefore provides for a system 100 and a controller 18 that is configured to, while the refrigeration circuit 32 is operating and in response to the temperature of the evaporator 116 being less than a first threshold value and the compressor 110 operating at a predetermined speed, open the second valve assembly 160 to divert a portion of refrigerant through the chiller 104 while another portion of refrigerant flows in parallel through the evaporator 116. The controller 18 is configured to receive a signal indicative of a request for operation of the chiller being off as a condition for opening the second valve assembly.

The controller is configured to, in response to opening the valve, start a timer. The controller is configured to close the second valve assembly in response to the timer reaching a predetermined time value. The controller 18 is further configured to close the second valve assembly in response to the temperature of the evaporator being above a second threshold value, the second threshold value being greater than the first threshold value.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   a fluid circuit having a chiller and containing a coolant;
   a refrigeration circuit for a cabin air conditioning system containing a refrigerant, the refrigeration circuit having a compressor, a condenser, a first valve assembly and a cabin evaporator in sequential fluid communication, the refrigeration circuit having a second valve assembly and the chiller positioned for parallel flow of refrigerant with the first valve assembly and the cabin evaporator;
   a temperature sensor positioned to measure a temperature of the evaporator; and
   a controller configured to, while the refrigeration circuit is operating and in response to the temperature of the evaporator being less than a first threshold value and the compressor operating at a predetermined speed, open the second valve assembly to divert a portion of refrigerant through the chiller while another portion of refrigerant flows in parallel through the evaporator.

2. The vehicle of claim 1 wherein the controller is further configured to close the second valve assembly in response to the temperature of the evaporator being above a second threshold value, the second threshold value being greater than the first threshold value.

3. The vehicle of claim 2 wherein the controller is further configured to, in response to opening the second valve assembly, start a timer; and
   wherein the controller is further configured to close the second valve assembly in response to the timer reaching a predetermined time value.

4. The vehicle of claim 1 wherein the controller is further configured to receive a signal indicative of a request for operation of the chiller being off as a condition for opening the second valve assembly.

5. The vehicle of claim 1 wherein the predetermined speed of the compressor is a minimum speed for operation of the compressor.

6. The vehicle of claim 1 wherein the first valve assembly is positioned at an inlet to the cabin evaporator; and
   wherein the second valve assembly is positioned at an inlet to the chiller.

7. The vehicle of claim 1 wherein the first valve assembly comprises a first shutoff valve and a first throttle valve;
   wherein the second valve assembly comprises a second shutoff valve and a second throttle valve; and
   wherein the controller is configured to control each of the first and second shutoff valves between a shut off position with zero flow therethrough and a full flow position.

8. The vehicle of claim 7 wherein a position of each of the first and second throttle valves are passively controlled via an outlet pressure of the evaporator and the chiller, respectively.

9. The vehicle of claim 1 wherein the first valve assembly comprises a first electronic throttle valve;
   wherein the second valve assembly comprises a second electronic throttle valve; and
   wherein the controller is configured to control each of the first and second electronic throttle valve to a shut off position with zero flow therethrough.

10. The vehicle of claim 1 wherein the fluid circuit further comprises a cooling passage for a traction battery.

11. The vehicle of claim 1 wherein the refrigeration circuit further comprises a counterflow heat exchanger having a first passage upstream of the first valve assembly, and a second passage downstream of an outlet of the evaporator, the first and second passages positioned for heat transfer therebetween.

12. A method of controlling a vehicle comprising:
operating a refrigeration circuit for a cabin air conditioning system containing a refrigerant, the refrigeration circuit having a compressor, a condenser, a first valve assembly and a cabin evaporator in sequential fluid communication with refrigerant flowing therethrough;
receiving a signal indicative of a temperature of the evaporator; and
while the refrigeration circuit is operating and in response to the temperature of the evaporator being less than a first predetermined value and the compressor operating at or below a predetermined speed, opening a second valve assembly in the refrigeration circuit to divert a portion of refrigerant through a chiller while another portion of refrigerant flows in parallel through the evaporator thereby increasing the temperature of the evaporator, the refrigeration circuit having the second valve assembly and the chiller positioned for parallel flow of refrigerant with the first valve assembly and the cabin evaporator.

13. The method of claim 12 further comprising closing the second valve assembly in response to the temperature of the evaporator being above a second predetermined value, the second predetermined value being greater than the first predetermined value.

14. The method of claim 12 further comprising, in response to opening the valve, starting a timer; and
closing the second valve assembly in response to the timer reaching a predetermined time value.

15. The method of claim 12 further comprising, in response to opening the second valve assembly, starting a timer; and
closing the second valve assembly in response to at least one of (i) the temperature of the evaporator being above a second predetermined value, the second predetermined value being greater than the first predetermined value, and (ii) the timer reaching a predetermined time value.

16. The method of claim 12 further comprising receiving a signal indicative of no request for operation of the chiller as a condition for opening the second valve assembly, wherein the chiller is an internal heat exchanger in a cooling circuit for a traction battery of the vehicle.

17. The method of claim 12 further comprising while the refrigeration circuit is operating and in response to the temperature of the evaporator being less than the first predetermined value and the compressor operating above the predetermined speed, maintaining the second valve assembly in the refrigeration circuit in a closed position and controlling a speed of the compressor to increase the temperature of the evaporator.

18. The method of claim 12 further comprising, while the second valve assembly is open, maintaining a speed of the compressor; and
while the second valve assembly is open, transferring heat from the portion of refrigerant in the chiller to coolant in the chiller and transferring heat from the another portion of refrigerant in the evaporator to air thereby reducing a load on the evaporator such that the temperature of the evaporator increases.

19. The method of claim 12 wherein the first valve assembly comprises a first shutoff valve and a first throttle valve, wherein the first shutoff valve is controllable to a shut off position with zero flow therethrough to close the first valve assembly;
wherein the second valve assembly comprises a second shutoff valve and a second throttle valve, wherein the second shutoff valve is controllable to a shut off position with zero flow therethrough to close the second valve assembly; and
the method further comprising passively controlling a position of each of the first and second throttle valves via an outlet pressure of the evaporator and the chiller, respectively.

20. A vehicle air conditioning system comprising:
a refrigeration circuit having a compressor, a condenser, and an evaporator in sequential fluid communication, with a valve assembly and a battery chiller positioned for parallel flow with the evaporator; and
a controller configured to, in response to a temperature of the evaporator being less than a first predetermined value and the compressor operating at a predetermined speed, open the valve assembly to divert a portion of refrigerant through the chiller and away from the evaporator.

* * * * *